United States Patent
Kim et al.

(10) Patent No.: US 6,476,906 B1
(45) Date of Patent: Nov. 5, 2002

(54) APPARATUS FOR MEASURING STRESS IN A THIN FILM AND METHOD OF MANUFACTURING A PROBE USED THEREFOR

(75) Inventors: Young Seok Kim, Seoul; Jong Ryul Jeong, Kyonggi-do; Sung Chul Shin, Taejon, all of (KR)

(73) Assignee: Korea Advanced Institute of Science and Technology (KR)

( * ) Notice: Subject to any disclaimer, the term of this patent is extended or adjusted under 35 U.S.C. 154(b) by 0 days.

(21) Appl. No.: 09/646,543

(22) PCT Filed: Jan. 19, 2000

(86) PCT No.: PCT/KR00/00033

§ 371 (c)(1),
(2), (4) Date: Sep. 18, 2000

(30) Foreign Application Priority Data

Jan. 19, 1999 (KR) .............................. 99-1423

(51) Int. Cl.$^7$ .......................... G01B 11/16; G01N 21/86
(52) U.S. Cl. ..................................... 356/32; 250/559.01
(58) Field of Search .......................... 356/27, 28.5, 28, 356/32, 35.5, 445, 630, 632, 600, 477, 482, 496, 498, 503; 250/559.01, 559.19, 559.27

(56) References Cited

U.S. PATENT DOCUMENTS 5,042,944 A * 8/1991 Lukasiewicz et al. ......... 356/33
5,864,393 A * 1/1999 Maris .......................... 356/28

FOREIGN PATENT DOCUMENTS

| JP | 7074223 | 3/1995 |
| JP | 09126913 | 5/1997 |
| JP | 111739973 | 7/1999 |

* cited by examiner

Primary Examiner—Michael P. Stafira
(74) Attorney, Agent, or Firm—Marger Johnson & McCollom, P.C.

(57) ABSTRACT

The present invention relates to an apparatus for measuring stress in a thin film and method of manufacturing a probe used therefor. The stress measurement apparatus of the present invention comprises a light source unit, a sensor unit which introduces light from the light source to the backside of a substrate and introduces the light reflected therefrom to a photodetector, a photodetector, and a unit which processes the intensity of detected light through an amplification. The sensor unit is a fiber-optic bundle probe which comprises a plurality of input optical-fiber strands, a plurality of output optical-fiber strands that are placed symmetrically around each of the input optical-fiber strands, and a capillary tube for integrating these optical-fiber strands by inserting them therein. In the arrangement of the optical-fiber strands, a simulation program can be used which simulates the experimental results for the best sensitivity. According to this invention, the stress unavoidably induced during the thin film deposition can be measured in an ultrahigh sensitivity on a real-time basis.

6 Claims, 4 Drawing Sheets

APPARATUS FOR MEASURING STRESS IN A THIN FILM AND METHOD OF MANUFACTURING A PROBE USED THEREFOR

TECHNICAL FIELD

The present invention relates to an apparatus for measuring stress, especially relates to an apparatus for measuring the unavoidably generated stress in a thin film in an ultra high sensitivity and on a real time and quantitative basis. The present invention also relates to a manufacturing method for a probe which is used for the aforementioned measuring apparatus, especially to a manufacturing method for a probe by an optimal arrangement of the optical fiber strands for introducing light and the receiving optical fiber strands.

BACKGROUND ART

Recently, most of the high technology devices are manufactured as a thin film type, but the thin film always has an unavoidable stress during the film formation. The stress inevitably changes various physical properties of the thin film. Accordingly, the stress may influence the quality of the device manufactured in a thin film type and may further lead to lower productivity. Therefore, in order to manufacture high quality devices, studies on reducing stress in a thin film are under progress.

Furthermore, development of stress measuring apparatus which measures stress not only during the thin film deposition on a real time basis but also during the process of atomic layer deposition. This is because the accurate measurement of stress not only is an important tool in the studies of the structural characteristics of the thin film but also plays an important role in controlling the degree of deformation.

Generally, stress has a close relationship with the thin film growth mechanism, developed microstructure, deposition condition of a thin film. In addition, the stress is a combined result of many factors such as a thermal stress resulting from the difference in the thermal expansion coefficient between the substrate and thin film, stress from the lattice mismatch, and inherent stress related to the microstructure of the thin film.

In the prior art methods, to measure these stresses, either a method utilizing X-ray or a method measuring a bending of a substrate has been used.

The method utilizing X-ray is a fundamental stress measuring method, but this method is utilizing a lattice diffraction which is not applicable to all types of thin films. Furthermore, even though the sample has a good lattice, the stress generated during the thin film formation is difficult to quantify on a real time basis.

The bending of a substrate can be measured by several methods which include a method utilizing the variation of a capacitance, a laser scanning method, or a Y-type non-contact displacement measurement method utilizing an optical fiber.

The capacitance measuring method measures the variation of a capacitance between a substrate and an electrode by the bending of a substrate during a thin film deposition, which is not applicable to a sample manufactured by a sputtering method due to a plasma.

The laser scanning method utilizes a position sensitive detection photodiode to measure the variation of the reflection angle of a laser beam according to the bending of a substrate after the beam is incident on the back side of the substrate. This method is mainly used for the circular samples.

In the Y-type non-contact displacement measurement method reported by H. Akimoto et al., a fiber optic bundle in the vicinity of a substrate directs a light beam toward the back side of the substrate and the bending of the substrate is measured from the intensity variation of a reflected beam. The sensitivity of a stress measuring apparatus used by Akimoto was 0.117 µm/mV.

The stress $\sigma_f$ on a thin film can be determined from the bending of a thin film according to the following Stoney Formula.

$$\sigma_f = \frac{\delta E_s d_s^2}{3l^2(1-v_s)d_f}$$

Where l is the width of the substrate, $d_f$ is the thickness of the thin film, $d_s$ is the thickness of the substrate, $v_s$ is the Poisson's ratio, $E_s$ is the Young's modulus, $\delta$ is the degree of bending of a substrate.

This formula is obtained from a equilibrium condition of a bending moments and a static equilibrium condition of forces generated between each interface. This equation reveals that to measure the accurate real time stress, bending of a substrate according to the film thickness should be measured precisely. Increase of $\delta$ during the increase of thickness of a thin film indicates tensile stress and decrease of $\delta$ indicates compressive stress.

As described above, methods and apparatuses measuring the degree of stress have been introduced by previous arts, but they exhibit low measurement reliabilities due to the difficulties in the stress measurement and the low sensitivity. Therefore, it is difficult to form a high quality thin film on a substrate due to the difficulties in the process control of the thin film deposition.

DISCLOSURE OF INVENTION

Accordingly, it is an object of the present invention to provide an apparatus for measuring stress in a thin film which has an atomic layer level resolution to manufacture high quality devices.

Another object of the present invention is to provide a method of manufacturing a fiber optic bundle probe used for the above stress measuring apparatus.

In order to achieve the aforementioned object, the stress measuring apparatus of the present invention comprises a fiber optic bundle probe including:

a plurality of optical fiber strands for introducing light to the back side of a substrate on which a thin film is formed;

a plurality of optical fiber strands placed symmetrically around each of the introducing optical fiber strands in order to receive light reflected from the back side of the substrate; and a capillary tube for integrating the introducing and receiving optical fiber strands by inserting parts of them therein.

Only one side end of the substrate is fixed on a substrate holder to allow a substrate bending during a thin film formation. The apparatus further comprises a distance control means which controls the distance between the back side of a substrate and a probe. There also is a photodetecting means which converts light signals from the receiving optical fiber to electrical signals.

In the present invention, the outer side of each introducing and receiving optical fiber strands is preferably coated with epoxy to prevent the damage from a sheer force. Also, light from a halogen lamp can be utilized as the light directed to the introducing optical fiber strands. A translator with a differential micrometer which can make a fine control of a distance can be used. More preferably, the apparatus further comprises means which amplifies the electrical signals and receives only direct current signals therefrom to eliminate noises. Still furthermore, for the application of the apparatus to thin films formed within a vacuum chamber, the apparatus may further comprise means for inserting the introducing and receiving optical fiber strands within the vacuum chamber while maintaining the air-tightness of the chamber.

In order to achieve the another object, the method of manufacturing a probe comprises the steps of:

preparing a plurality of optical fiber strands for introducing light to the back side of a substrate on which a thin film is formed and a plurality of optical fiber strands for receiving light reflected from the back side of the substrate;

coating the outer side of each introducing and receiving optical fiber strands with epoxy;

integrating the introducing and receiving optical fiber strands by inserting parts of the strands within a capillary tube; and polishing the ends of the introducing and receiving optical fiber strands.

In the above manufacturing method, the integrating step of the optical fiber strands preferably comprises the steps of:

varying the arrangement of the introducing and receiving optical fiber strands in a two dimension random structure;

introducing light to the introducing optical fiber strands and then reflecting the light at the back side of the substrate;

receiving the reflected light by the receiving optical fiber strands;

detecting the received light; and determining the positions of the introducing and receiving optical fiber strands, which maximizes the intensity variation of the detected light according to the distance variation between the back side of the substrate and said probe.

BEST MODE FOR CARRYING OUT THE INVENTION

Figure 1:
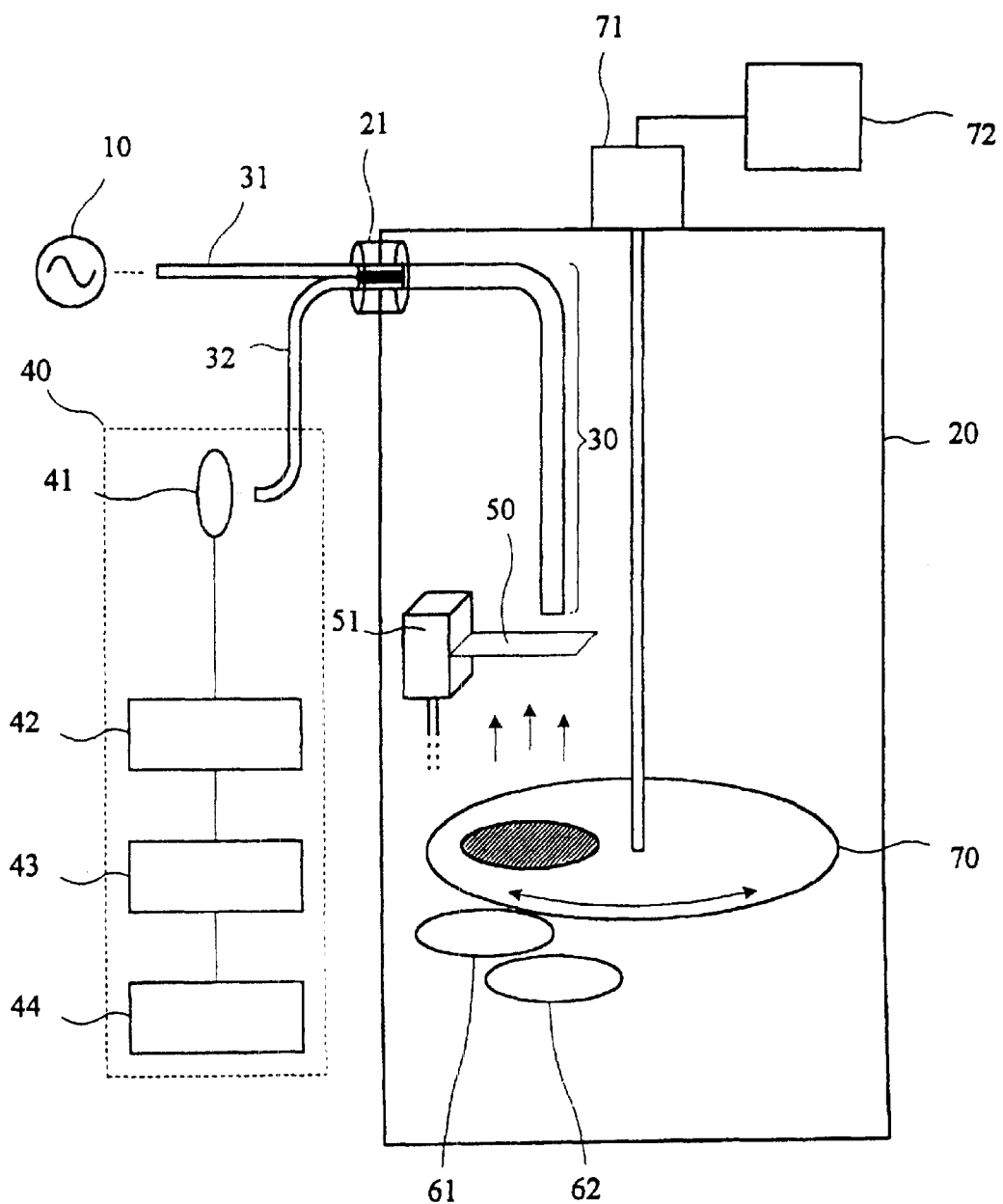
FIG. 1 schematically shows an application example in which the stress-measuring apparatus of the present invention is employed in a vacuum chamber.

FIG. 1 schematically shows an application example in which the stress-measuring apparatus of the present invention is employed in a vacuum chamber. Referring to FIG. 1, the apparatus for measuring stress in a thin film is comprised of a light source 10; a chamber 20 in which the thin film is deposited; a substrate holder 51 which fixes only one side end of a substrate 50 to allow the bending of the substrate 50 during the thin film formation; a fiber optic bundle probe 30 placed within the chamber 20 in order to detect the bending of the substrate 50; a light signal processing unit 40 which converts the detected light signals to electrical signals. In this example, a quartz tungsten halogen lamp is used as the light source 10. Light is incident upon the back side of the substrate 50 via an introducing fiber optic bundle 31, and the reflected light from the back side of the substrate 50 is received by a receiving fiber optic bundle 32. In a fiber optic bundle probe 30, the optical fiber strands forming the introducing and receiving fiber optic bundles 31 and 31 are mixed and arranged for an integration. The Z-axis translator (not shown) attached with a differential micrometer can be added to the measuring apparatus to control the distance between one end of the fiber optic bundle probe 30 and the substrate 50 by several microns.

In addition, a feedthrough 21 is used to insert the fiber optic bundle probe 30 within the chamber 20. The feedthrough 21 is composed of an aluminum tube through which the fiber optic bundle probe 30 passes; a silicon cone wedge in which the aluminum tube is inserted; and a 6φ diameter vacuum fringe in which the silicon cone wedge is inserted. Also, the space on both sides of the tube created by the optical fibers which pass inside the aluminum tube is sealed with vacuum epoxy (Torr Seal).

Moreover, the substrate 50 on which the thin film is deposited is fixed on the substrate holder 51 by a cantilever method in which one side end of the substrate 50 is fixed on a substrate holder 51 and the other end is allowed to move freely.

Furthermore, under the substrate 50 are the first target 61 and the second target 62 which are the sources for the thin film formation. In this example, the first target 61 is nickel and the second target 62 is palladium. This indicates that a multilayer thin film with different compositions can be deposited. The purity of nickel target and palladium target was 99.999%, respectively. Between the substrate 50 and the first and second targets 61 and 62, there is a shutter 70 which exposes the substrate 50 selectively to the first and second targets 61 and 62. The shutter 70 has a through hole and can be rotated by a step motor 71 which is connected thereto. Also, the step motor 71 is connected to a step motor controller 72.

Still furthermore, the a light signal processing unit 40 is composed of a photodetector 41 which converts the reflected light signals from the substrate 50 to electrical signals; signal detecting means 42 which amplifies signals from the photodetector 41 and outputs the signal as a direct voltage through a low pass filter to remove surrounding noises; voltage measuring means 43 which measures direct voltage from the signal detector 42; and a microcomputer 44 which stores and interprets varying voltages.

Figure 2A:
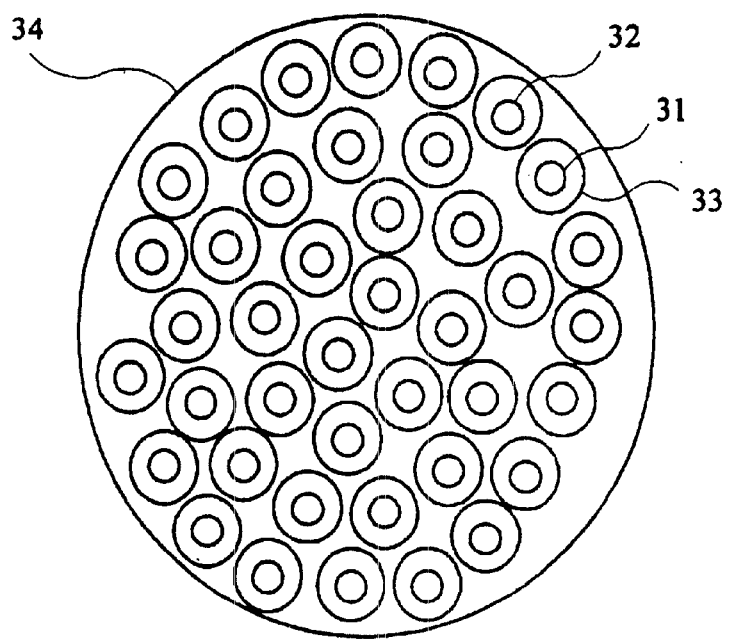
FIG. 2A and FIG. 2B respectively show the cross section and arrangement of the fiber optic bundle probe for use in the stress-measuring apparatus of the present invention.
Figure 2B:
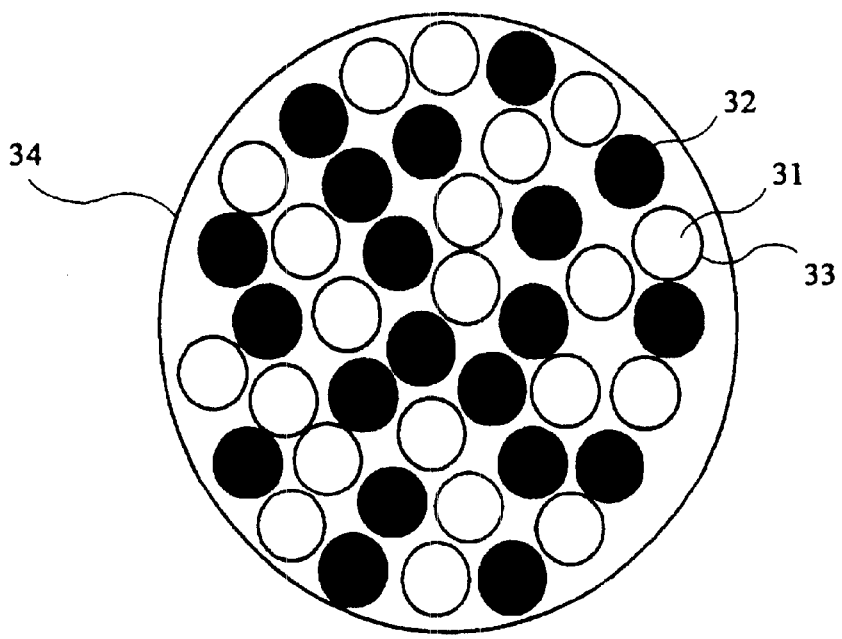

FIG. 2A and FIG. 2B respectively show the cross section and arrangement of the fiber optic bundle probe for use in the stress-measuring apparatus of the present invention. Referring to FIG. 2, twenty strands of introducing optical fibers 31 are arranged near twenty strands of receiving optical fibers 32. The optical fiber for use in the probe is a multimode optical fiber with a core diameter of 50 μm and a cladding 33 diameter of 125 μm. Also, a capillary tube 34 which has less than 1 mm of an inner diameter is used for the body of fiber optic bundle probe to fix the optical fibers therein.

Low viscosity UV epoxy 81 (trademark) manufactured by Nornald company was coated on the optical fibers to prevent damages on the optical fibers by a shear force. Also, in order to integrate each of the optical fibers with the same force, a fixed frame is manufactured and used for integration. After the integration of the optical fibers, the surface of the probe was polished with $SeO_2$.

Described below are the principle of stress measurement utilizing the fiber optic bundle probe manufactured according to the above method, and features of the sensitivity characteristic curve.

First of all, the stress is measured by detecting the variation of the light intensity according to the variation of the distance between the substrate and fiber optic bundle probe. That is to say, the measurement of intensity of reflected light using a neighboring optical fiber pair gives the displacement from the sample to the is optical fiber pair. This method utilizes the following principle. If the optical fiber pair is contacting the surface of the sample, then there is no reflected light. The area shined by the introducing optical fiber increases as the optical fiber pair recedes from the surface of the sample, which results in the intensity increase of light reflected to the receiving optical fiber. At this time, the intensity of light increases linearly to the distance, and the linearly increased portion shows a rapid change of the light intensity according to the change in the distance. Therefore, accurate measurement of displacement utilizes this initial slope. At an increased distance, the intensity of the reflected light is maximized when the reflected light from the cone edge of the introducing optical fiber ends on the tip of the receiving optical fiber. At further increased distance, the intensity of reflected light decreases according to the distance. In principle, two strands of optical fibers can constitute this system, but the fiber optic bundle probe of the present invention is necessary to increase both the intensity of reflected light and the initial slope of the characteristic curve.

The sensitivity characteristic curve of the fiber optic bundle probe changes depending upon such parameters as the diameter of optical fiber core, diameter of optical fiber cladding, numerical aperture (NA) of optical fiber, arrangement of optical fibers within the probe, reflectivity of the substrate surface. Especially, in a two dimensional lattice structure in which the optical fiber bundles are arranged regularly, the sensitivity of measurement according to the distance change is maximized when the receiving optical fibers are arranged symmetrically around the introducing optical fibers. However, such an ideal two dimensional lattice structure is difficult to make, and a probe with random optical fiber bundle structure, as shown in FIG. 2A, is generally used. Therefore, the sensitivity characteristic curve can be enhanced depending on the arrangement of the introducing and receiving optical fibers within the previously made fiber optic bundle structure.

In this example, for an optical fiber with an arbitrary specification, a simulation program which can predict the variation of characteristic curve according to a the core diameter, cladding diameter, NA, and the arrangement of introducing and receiving optical fibers was used to find out optical fiber arrangement with the best sensitivity in a specific two dimensional random structure. The optical fiber arrangement with the best sensitivity was obtained by the application of the computer simulation program on the cross section of the optical fiber bundle probe with 40 fiber strands shown in FIG. 2A. The computer simulation program yields characteristic curves for all the possible arrangements of the optical fiber bundle structure represented in FIG. 2A with 20 strands of introducing optical fibers and 20 strands of receiving optical fibers, and the program selects the arrangement with the best sensitivity. By this method, the best arrangement of introducing and receiving optical fibers as shown in FIG. 2b was determined from the fiber optic bundle probe having 40 fiber strands. While the end of probe was observed with a microscope, the introducing and receiving optical fibers were arranged within the fiber optic bundle probe according to the determined optical fiber arrangement.

Figure 3:
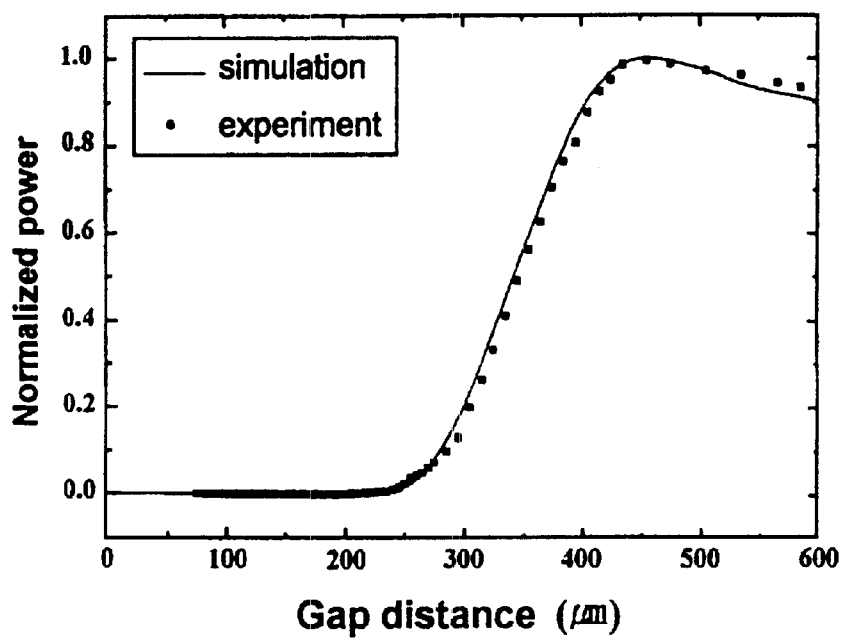
FIG. 3 is a graph showing a sensitivity characteristic curve at the most sensitive arrangement according to a simulation program and an experimentally obtained sensitivity characteristic curve by a probe manufactured according to the present invention.

FIG. 3 is a graph showing a sensitivity characteristic curve at the most sensitive arrangement according to a simulation program and an experimentally obtained sensitivity characteristic curve by a probe manufactured according to the present invention. Referring to FIG. 3, the experimentally obtained sensitivity characteristic curve agrees nicely with that obtained by a simulation program. This indicates that the simulation program predicts precisely the linear range of the real characteristic curve and initial slope. The linear range of the obtained characteristic curve was from 350 μm to 450 μm and the sensitivity was 0.0076 μm/mV. Such a sensitivity is 15 times higher than that of the previous stress measuring apparatus manufactured by Akimoto. This result is because the optical fibers are arranged closely and the introducing and receiving optical fiber strands are most optimally arranged using the simulation program. The stress generated during the thin film formation is different depending on the thin film materials and the deposition conditions. Generally, the displacement due to a deposition with a thickness of one atomic layer is around 1 μm. The signal change by this displacement is around 134 mV, which is detectable by a conventional voltage meter. Therefore, the manufactured non-contact displacement apparatus can measure stress which results from the deposition of one atomic layer. In other words, stress resulting from the deposition of one atomic layer can be measured by the apparatus for measuring stress utilizing the fiber optic bundle probe manufactured according to the present invention. In addition to this highly sensitive stress measuring function, the apparatus of the present invention can process the light signal at every 0.05 second by a computer interface and can analyze the changes in stress during the thin film growth on a real time basis.

The method for measuring stress utilizing the above apparatus is described below.

A glass plate with 130 μm thickness, 4 cm length, and 1.1 cm width is used for a substrate for a multi-layer thin film of a nickel/palladium super lattice. For a quick deposition, DC magnetron sputtering method, which is most popular in the current sputtering process, is used. Aluminum reflection layer with a 1000 Å thickness is coated on the opposite side of the surface on which the nickel/palladium multi-layer thin film is deposited. In a sputtering process, the chamber pressure before the introduction of argon is below $8 \times 10^{-7}$ Torr, the argon pressure is 7 mTorr, and the DC power applied to each nickel and palladium target is 30 W. A multi-layer thin film is formed by exposing the substrate to the nickel target and palladium target alternatively by controlling the shutter. The distance between the substrate and the fiber optic bundle probe was maintained for the best sensitivity.

Once the deposition begins under the above condition, light from the light source is incident upon the one end of 20 strands of introducing optical fibers, which is then incident on the substrate from the other end of introducing optical fiber within a chamber. The light is reflected from the substrate, received by 20 strands of receiving optical fibers, and is then converted to an electrical signal at a photodetector.

The signals from the photodetector is amplified and is output as a DC voltage after a filtering through a low pass filter to remove surrounding noises. Then, the DC voltage output is displayed on a signal detection device. Also, the varying voltage is stored and analyzed by a microcomputer.

Figure 4:
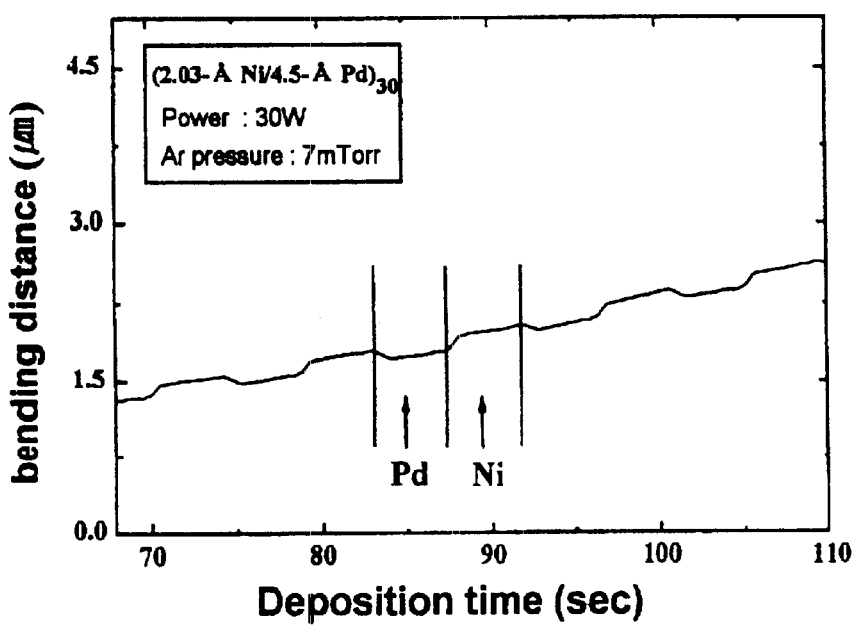
FIG. 4 is a graph showing the variation of the bending distance obtained by an application of the measuring apparatus of the present invention to a multi-layer thin film which is formed by alternate depositions of a nickel layer and a palladium layer.

FIG. 4 is a graph showing the variation of the bending distance obtained by an application of the measuring apparatus of the present invention to a multi-layer thin film which is formed by alternate depositions of a nickel layer and a palladium layer. Referring to FIG. 4, the substrate bends due to stress during deposition. Also, the bending is prominent at the deposition of a nickel layer from a palladium layer. The bending is decreased at the deposition of a palladium layer from a nickel layer. This shows that the tensile stress and the compressive stress are mostly generated at an interface.

Figure 5:
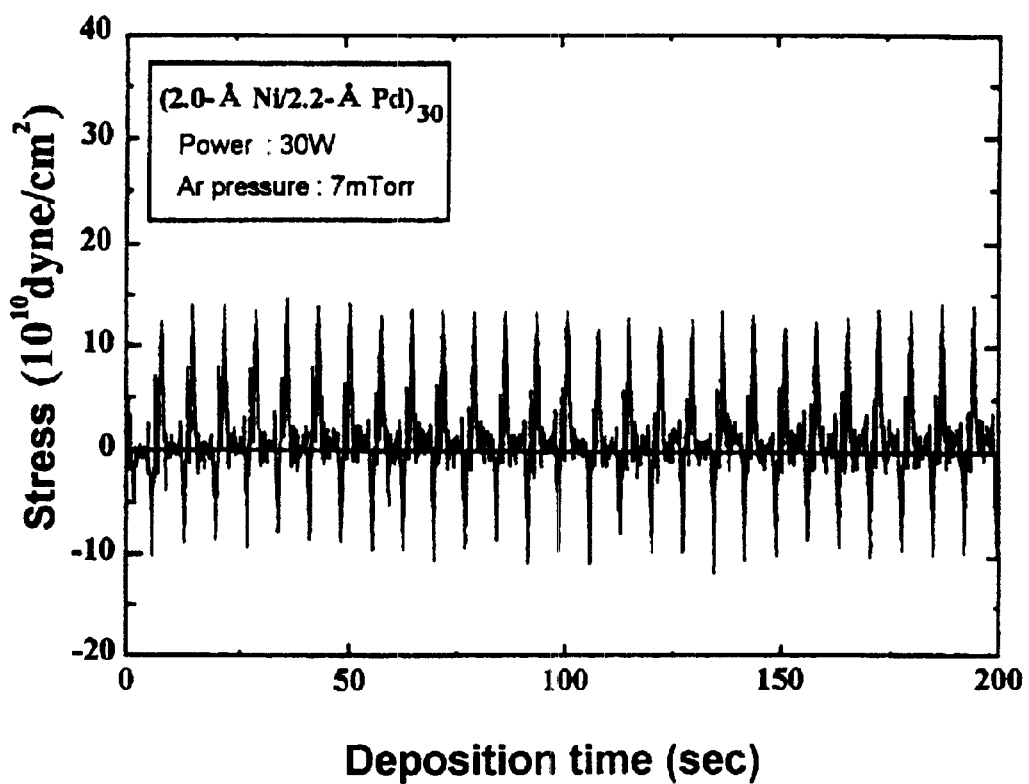
FIG. 5 is a graph showing stress at each layer obtained by an application of the measuring apparatus of the present invention to a multi-layer thin film which is formed by alternate depositions of a nickel layer and a palladium layer.

FIG. 5 is a graph showing stress at each layer obtained by an application of the measuring apparatus of the present invention to a multi-layer thin film which is formed by alternate depositions of a nickel layer and a palladium layer.

Nickel has large tensile stress at the initial stage of deposition, which converts to smaller tensile stress before the deposition of one whole atomic layer. Palladium has compressive stress at the initial stage of deposition, which converts to tensile stress. The large stress at the initial stage of deposition is due to the 9.5% of lattice mismatch between the nickel and palladium. Palladium has a larger lattice constant than nickel, which causes compressive stress when a palladium layer is deposited on a nickel layer, and tensile stress when a nickel layer is deposited on a palladium layer. The significant change of stress before the deposition of one whole atomic layer is due to the transition of coherent matching to incoherent matching of each layer structure. Theoretically, this is explained by the development of dislocation due to the increase of elastic energy. The observation of transition from coherent matching to incoherent matching during the deposition of one atomic layer is not reported in the prior arts. The detection was made possible because the apparatus of the present invention is sensitive enough to measure the stress due to the deposition of one atomic layer.

The transition thickness from the coherent to incoherent matching measured in FIG. 4 and FIG. 5 agrees well with the theoretically predicted value, which shows the high reliability of the apparatus of the present invention.

This example explained the deposition of thin film within a vacuum chamber, but the fiber optic bundle probe of the present invention is applicable to thin film deposition process, or a related process as well as an apparatus for other purposes.

INDUSTRIAL APPLICABILITY

As described above, according to the present invention, stress that is generated unavoidably during the thin film deposition can be measured with an atomic layer level sensitivity on a real time basis. This minimizes the influence of stress on a physical property of a thin film, and reliability of the thin film can be increased due to the quantitative examination.

Especially, the real time measurement of stress at the interface of thin film manufactured by complex materials such as multi-layer thin films is possible, which is highly useful in the investigation of thin film structure and property according to the change of stress.

What is claimed is:

1. An apparatus for measuring stress in a thin film, the apparatus comprising:
    (a) a light source;
    (b) a fiber optic bundle probe including,
    (b-1) a plurality of optical fiber strands for introducing light from said light source to the back side of a substrate on which a thin film is formed;
    (b-2) a plurality of optical fiber strands placed symmetrically around each of said introducing optical fiber strands in order to receive light reflected from the back side of said substrate; and
    (b-3) a capillary tube for integrating said introducing and receiving optical fiber strands by inserting parts of said strands therein;
    (c) a substrate holder for fixing one side end of said substrate to allow a substrate bending during a film formation;
    (d) means for controlling the distance between the back side of said substrate and said probe;
    (e) a photodetecting means which converts light signals from said receiving optical fiber to electrical signals; and
    (f) means for inserting the introducing and receiving optical fiber strands within a vacuum chamber while maintaining the air-tightness of the chamber, for the application of the apparatus to thin films formed within said vacuum chamber.

2. The apparatus of claim 1, wherein the outer side of each introducing and receiving optical fiber strands is coated with epoxy to prevent the damage from a sheer force.

3. The apparatus of claim 1, wherein said light source is a halogen lamp.

4. The apparatus of claim 1, wherein said distance controlling means is a translator with a differential micrometer.

5. The apparatus of claim 1, further comprising means for amplifying said converted electrical signals; and a low pass filter which eliminates noises and receives only direct current signals from the amplified signals.

6. A method of manufacturing a probe for use in an apparatus for measuring stress in a thin film, the method comprising the steps of:
    preparing a plurality of optical fiber strands for introducing light to the back side of a substrate on which a thin film is formed and a plurality of optical fiber strands for receiving light reflected from the back side of said substrate;
    coating the outer side of each introducing and receiving optical fiber strands with epoxy;
    integrating said introducing and receiving optical fiber strands by inserting parts of said strands within a capillary tube; and
    polishing the ends of said introducing and receiving optical fiber strands,
    wherein the integrating comprises:
    varying the arrangement of said introducing and receiving optical fiber strands in a two dimension random structure;
    introducing light to said introducing optical fiber strands and then reflecting the light at the back side of said substrate;

receiving the reflected light by said receiving optical fiber strands;

detecting the received light; and determining the positions of said introducing and receiving optical fiber strands, which maximize the intensity variation of the detected light according to the distance variation between the back side of said substrate and said probe.

* * * * *